United States Patent

[11] 3,599,769

[72] Inventor Frederick J. Gardella
 Salem, Mass.
[21] Appl. No. 758,029
[22] Filed Sept. 6, 1968
[45] Patented Aug. 17, 1971
[73] Assignee W. R. Grace & Co.
 Duncan, S.C.

[54] ROLLER CONVEYOR
 5 Claims, 5 Drawing Figs.

[52] U.S. Cl. ..................................... 193/35 R,
 193/37
[51] Int. Cl. ..................................... B65g 13/00,
 B65g 39/09
[50] Field of Search ........................... 193/35-
 —37; 85/8.8

[56] References Cited
UNITED STATES PATENTS

| | | | |
|---|---|---|---|
| 2,487,802 | 11/1949 | Heimann ..................... | 85/8.8 |
| 2,616,733 | 11/1952 | Strange ....................... | 85/8.8 |
| 3,489,468 | 1/1970 | Buck ............................ | 308/20 |
| 978,466 | 12/1910 | Mathews ..................... | 193/35 |
| 2,391,272 | 12/1945 | Rose ............................ | 193/35 |
| 2,827,153 | 3/1958 | Olk et al. .................... | 193/35 X |
| 3,036,691 | 5/1962 | Byrnes ........................ | 193/36 X |
| 3,252,556 | 5/1966 | Isacsson ..................... | 193/35 X |
| 3,416,638 | 12/1968 | Buck ........................... | 193/37 |

*Primary Examiner*—Evon C. Blunk
*Assistant Examiner*—W. Scott Carson
*Attorneys*—John J. Toney, William D. Lee, Jr. and Edward J. Hanson, Jr.

ABSTRACT: A roller conveyor comprising two parallel, slotted side rails and a plurality of rollers having pushnut retained bearing assemblies carried by extended shafts, the ends of said shafts being held in said slots and being easily removable therefrom.

ROLLER CONVEYOR

This invention relates to improvements in roller conveyors of a type having parallel, elongated side support members with a series of rollers supported thereby.

Heretofore, each support member has consisted of a side rail with cutouts located along the upper edge to receive the ends of the shafts of the rollers. In some instances the ends of the shafts are threaded to receive a tightening nut so that the shaft may be securely held in the side rail. In other instances, the shaft end area will be provided with a peripheral slot which must be carefully fitted into the side rail. In both of these aforementioned instances assembling and dismantling a roller conveyor is both tedious and time consuming. Therefore, it is one object of the present invention to provide a roller conveyor in which the rollers may be easily places in and removed from the supporting side rails.

It is another object of the present invention to provide a roller conveyor in which the rollers may be assembled with a minimum of effort.

These and other objects are achieved by a roller conveyor in which each roller comprises a tube, a concentrically located shaft which extends beyond the ends of the tube, and bearing assemblies in each end of the tube. The ends of the shaft of each roller rest in aligned slots in two side rails. The slots are open so as to receive the ends of the shaft in a slidable fit and support the shafts. This invention may be better understood by referring to the following detailed description and drawings wherein.

Figure 1:
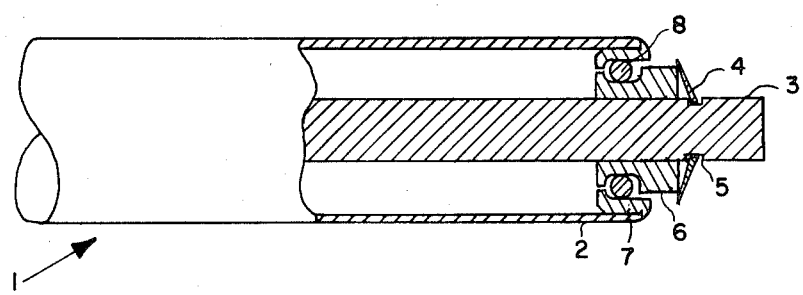
FIG. 1 is a partial cross section of the roller of the present invention showing the bearing and pushnut assembly.
Figure 3:
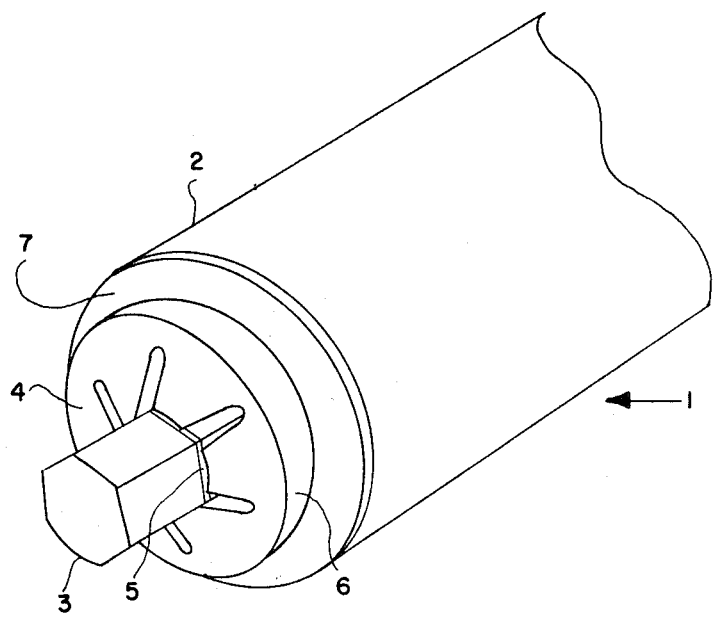
FIG. 3 is a perspective drawing showing one end of an assembled roller.

Referring now to the drawings, particularly FIGS. 1 and 3, roller 1 can be seen. The roller comprises an elongated tube 2 which is preferably constructed of stainless steel or any other suitable corrosion-resistant metal. Located concentrically in tube 2 is shaft 3 whose ends extend beyond the ends of tube 2. Preferably shaft 3 has a hexagonal cross section; and, preferably, within the scope of this invention would by any shaft whose cross section could be a geometrical configuration having two parallel sides such as a square, hexagon, octagon, etc. However, a round shaft could also be used.

The bearing assembly comprises stationary race 6, rotating race 7, and a plurality of ball bearings 8. Stationary race 6 has a passageway therethrough having a cross section of the same geometrical configuration as the cross section of shaft 3. The passageway is only slightly larger than the shaft 3 so that the shaft will slide easily therethrough but will not rotate therein. If a round shaft is used then the bearing race would be free to rotate; however, this is not a preferred construction. Rotating race 7 has a circular outer surface whose diameter is smaller than the inner diameter of tube 2. The outer surface of race 7 is provided with a lip whose outer diameter matched the outer diameter of tube 2. This lip prevents the bearing assembly from sliding inside tube 2. A plurality of ball bearings 8 are disposed in the cooperating race channels of stationary race 6 and rotating race 7. While it is not shown in the drawings, the actual construction of the bearing assembly is such that race 6 is in two sections which are press fitted together to form the final bearing assembly.

Shaft 3 is provided with peripheral groove 5 which retains pushnut 4. In assembly the roller pushnut 4 is forcibly pushed against rotating race 7 with the bearing assembly in the end of tube 2. Pushnut 4 is springlike or resilient so that when it is locked in groove 5 it is in compression between shaft 3 and stationary race 6. The invention is not limited to a pushnut as any suitable means which can maintain a compressive force between the groove 5 in shaft 3 and the rotating race 6 may be used.

Figure 2:
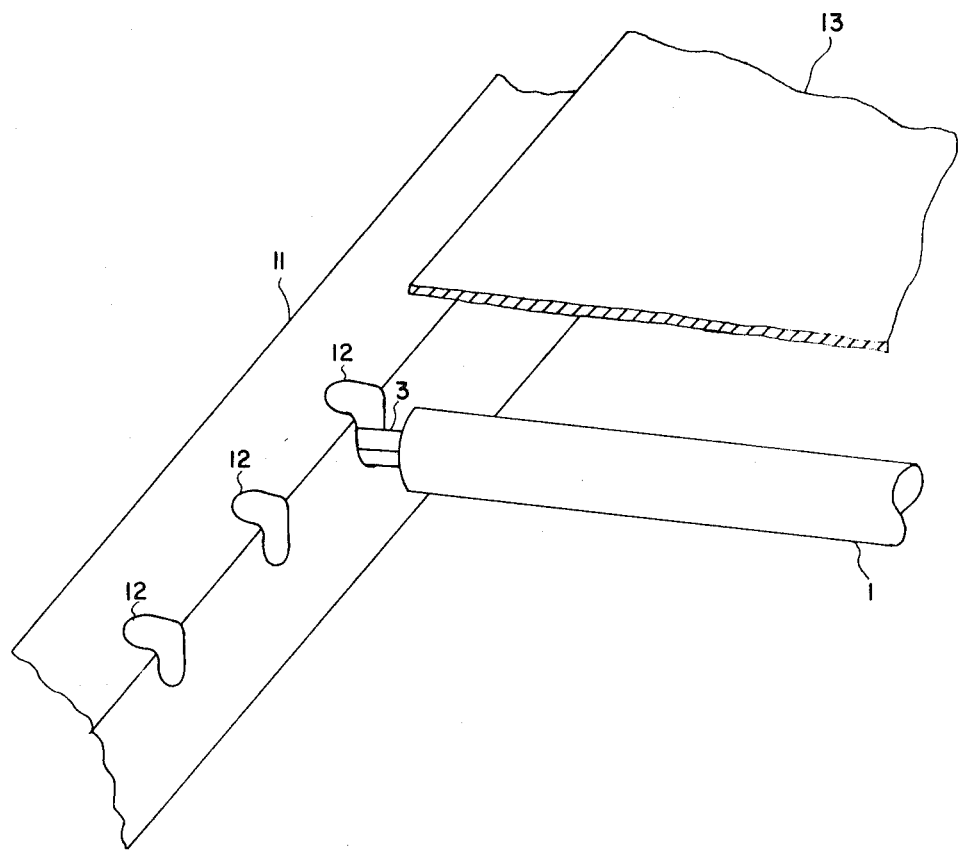
FIG. 2 is a partial perspective showing the ends of the roller shaft in the side rail slots.
Figure 4:
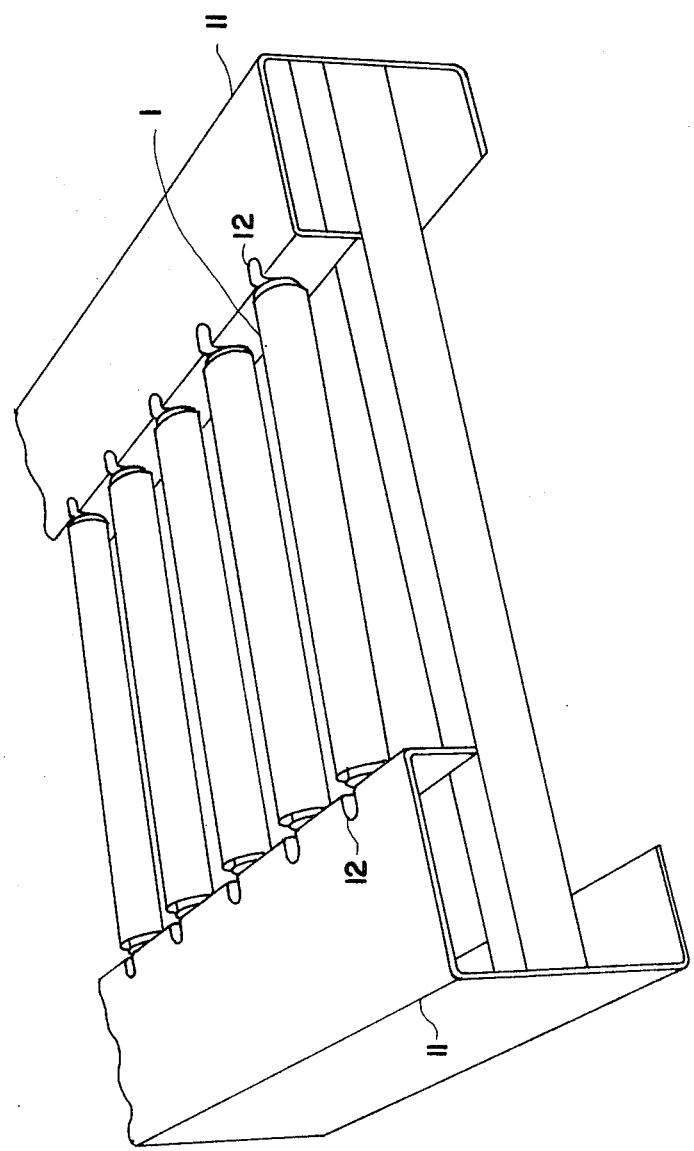
FIG. 4 is a perspective drawing of an assembled roller conveyor bed.
Figure 5:
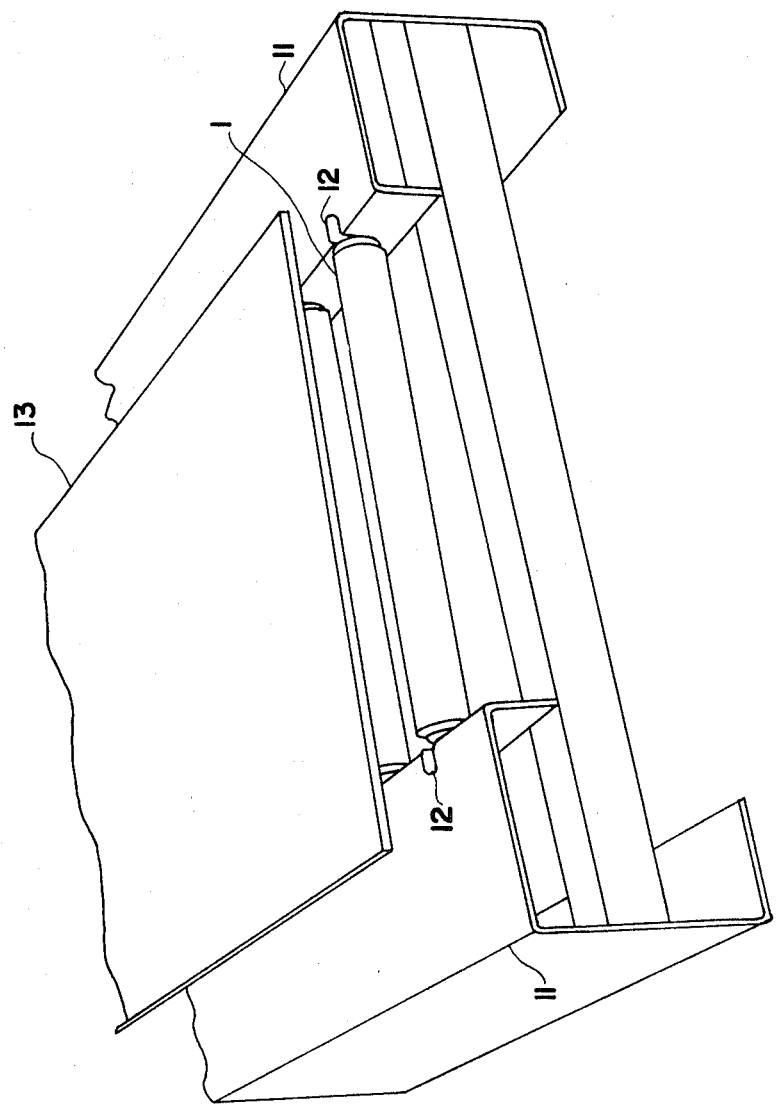
FIG. 5 shows a roller conveyor bed of FIG. 4 with a belt passing thereover.

Referring now to FIG. 2, 4 and 5 the two parallel side rails 11 may be seen. These rails are of one piece construction having a horizontal bottom or base wall acting as a supporting member, a vertical or upright sidewall carried by the base wall, a horizontal top wall perpendicular to the vertical sidewall, and a vertical inner wall depending from the top wall. In the area of the junction between the top wall and the vertical wall slots 12 are provided. Part of slot 12 is in the top wall and the remaining portion of slot 12 is in the vertical wall. Preferably, the sides of slots 12 are parallel with the distance between the parallel sides being greater than the distance between the parallel sides of shaft 3 so as to permit shaft 3 to slide in slots 12 but not rotate therein. If a round shaft is used, it may be permitted to rotate. This slotted construction permits very easy assembling of the roller conveyor bed since each roller may be quickly dropped into place. The resulting roller conveyor bed may be used with or without a conveyor belt 13. The depth of the slot in the inner vertical wall will be such that the outer surface of the roller 1 will be above the top wall of the side rails 11.

The advantages of the simplified construction and ease of assembly of the above described conveyor will be readily apparent to those skilled in he art. The description is not limitative and the scope of the invention is restricted only by the following claims.

I claim:
1. In a roller conveyor the combination comprising:
   a. at least one roller, a roller comprising
      1. an elongated, open-ended cylindrical tube having a uniform inner diameter throughout its length,
      2. two bearing assemblies, one of said assemblies being located at one end of said tube and the other assembly being located at the other end, each of said assemblies consisting of an outer and inner race, said outer race snugly engaging the inner surface of said tube and having a radial protuberance therearound abutting the end of said tube to limit the entry of said outer race into said tube,
      3. an elongated, concentrically located unthreaded shaft within said tube, the ends of said shaft being extended beyond the ends of said tube; each of said extended portions of said shaft being provided with a peripheral groove;
      4. resilient retention means in compressive relationship between a respective bearing assembly and groove thus retaining said bearing assemblies in a supporting relationship with said tube, and,
   b. two side rails for supporting said rollers, each of said rails comprising
      1. a base supporting member,
      2. a vertical sidewall carried by said base member,
      3. a horizontal top wall extending perpendicularly from said vertical sidewall,
      4. a vertical inner wall depending from said top wall, said top and inner walls having a series of open slots in the region of their junction, each of said slots having opposed parallel sides, the sides of said slots being spaced to accommodate the ends of said shaft in slidable engagement, said shaft ends being supported in the bottom of said slots.

2. The roller conveyor of claim 1 wherein said elongated shaft has at least two parallel sides.

3. The roller conveyor of claim 2 wherein said elongated shaft has a hexagonal cross section.

4. The roller conveyor of claim 3 wherein said retention means are pushnuts.

5. The roller conveyor of claim 4 wherein said bearing assembly comprises:
   a. a plurality of ball bearings,
   b. a stationary race with a passageway therethrough suitable for mounting on said hexagonal shaft, and
   c. a rotating race cooperating with said stationary race for supporting said tube, said stationary and said rotating races defining a channel therebetween for carrying said ball bearings.